Sept. 4, 1928.
J. F. RICHARDSON
1,683,097
BRAKE FOR MOTOR VEHICLES
Filed April 3, 1924
2 Sheets-Sheet 1
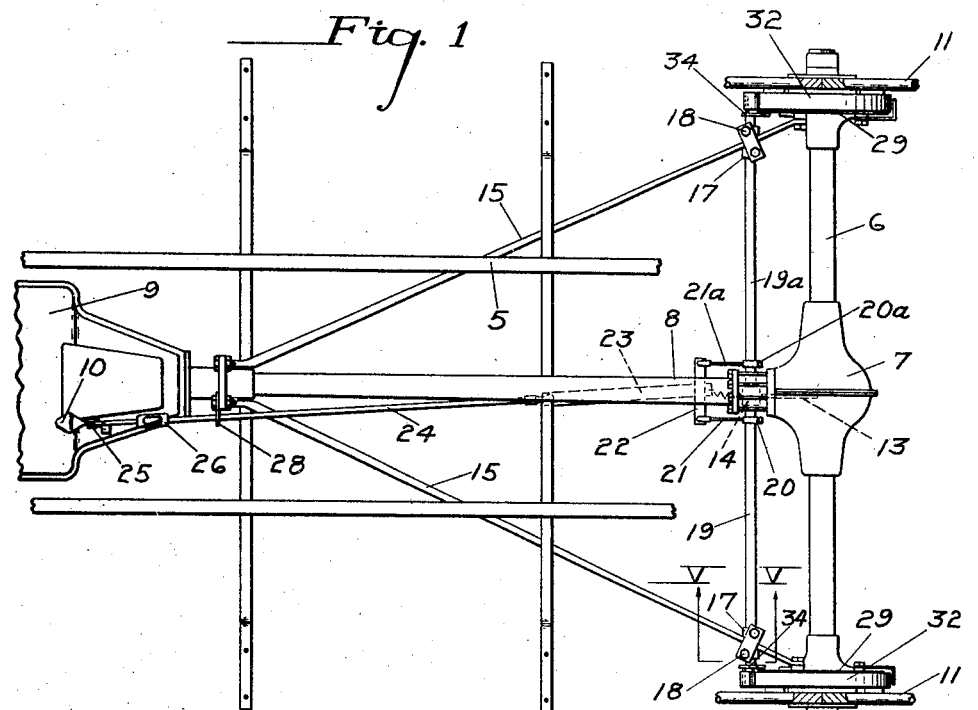
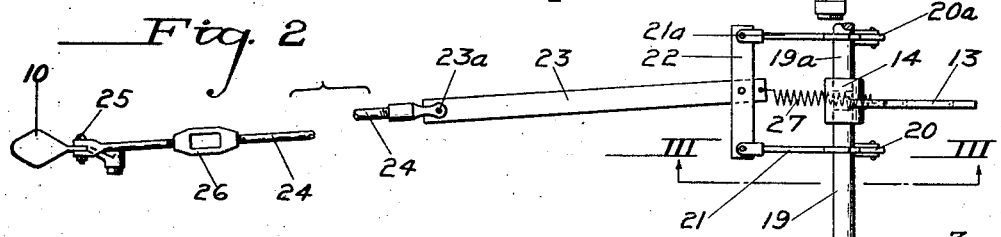
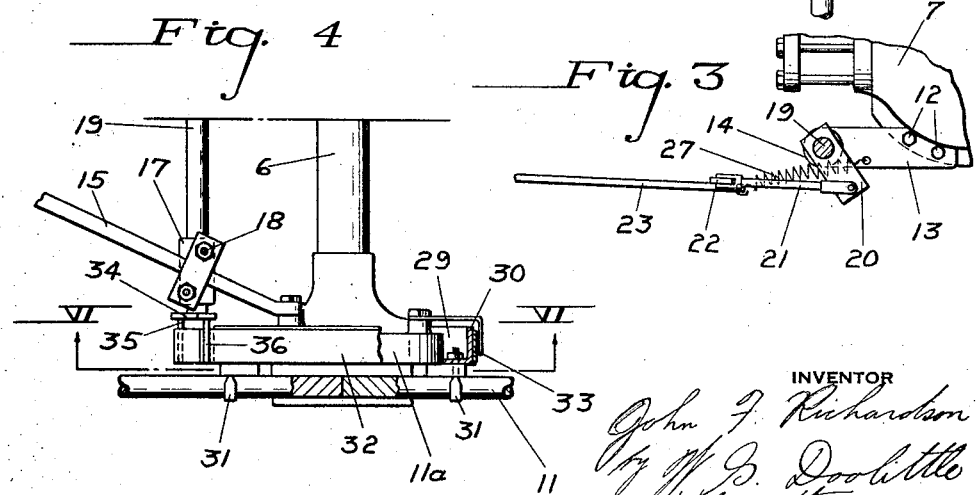
INVENTOR
John F. Richardson
By W. S. Doolittle
his attorney

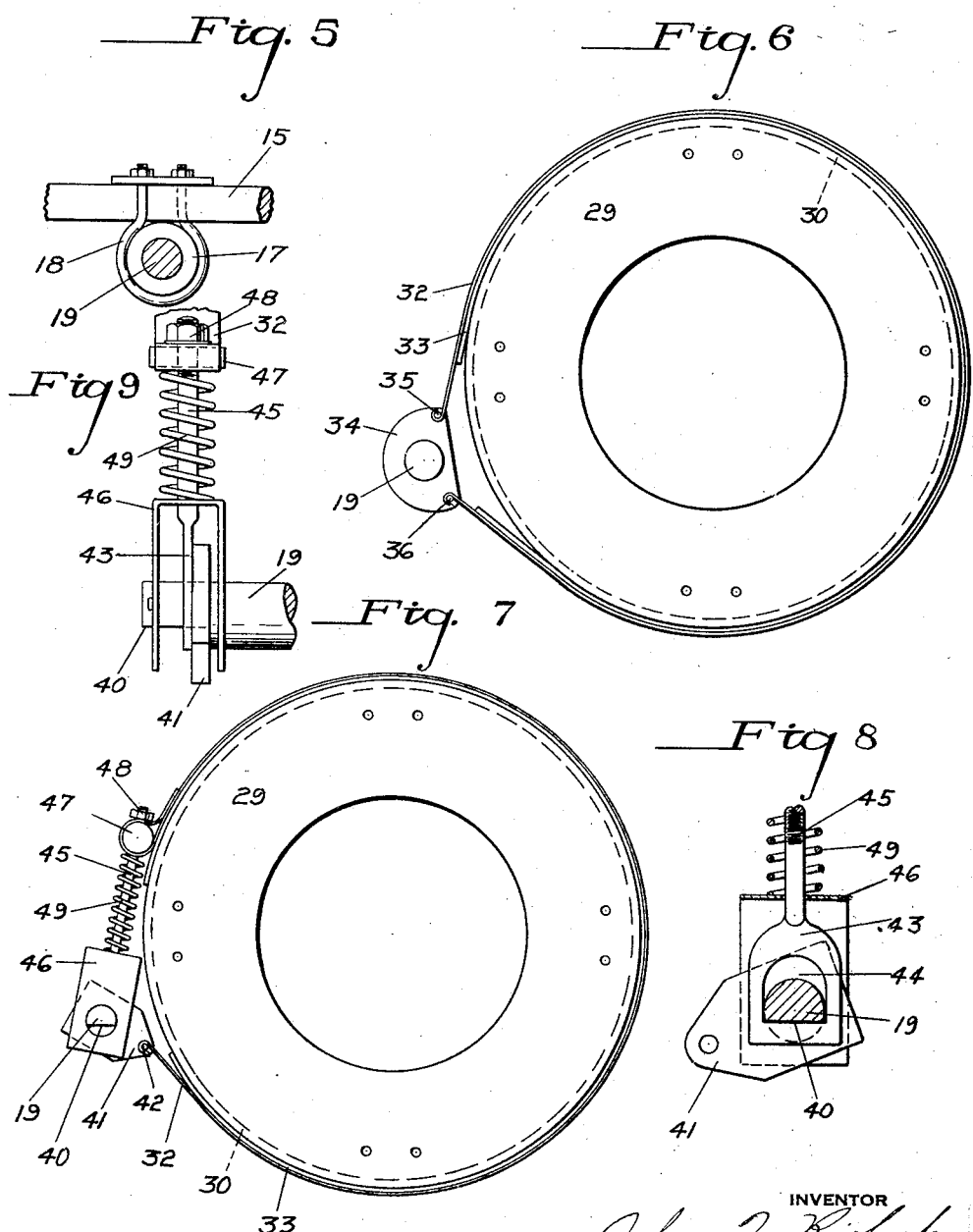

Patented Sept. 4, 1928.

1,683,097

UNITED STATES PATENT OFFICE.

JOHN F. RICHARDSON, OF PITTSBURGH, PENNSYLVANIA.

BRAKE FOR MOTOR VEHICLES.

Application filed April 3, 1924. Serial No. 703,964.

This invention is for a brake for automobiles, particularly automobiles of the well known "Ford" make.

The Ford automobile, as at present manufactured, has a hand brake operating braking elements within brake drums carried on the back wheels. The foot brake, however operates entirely in the transmission, and it is the desire of a great many Ford owners to have a foot brake that operates directly on the back wheels.

To this end, my invention has for its principal object to provide a foot operated brake acting directly on the rear wheels or rear axle, which may be readily applied to Ford automobiles without alteration of their present construction.

The invention has for its further objects to provide an extremely efficient brake for automobiles of this type.

The invention may be readily understood by reference to the accompanying drawings, in which:

Fig. 1 represents a plan view of the rear end of a Ford chassis, with my brake applied thereto;

Fig. 2 is an enlarged view of the brake pedal and operating connections, including the equalizer;

Fig. 3 is a section in the plane of line III—III of Fig. 2, showing a side view of the equalizer;

Fig. 4 is a top plan view, partly broken away, of the brake on the wheel;

Fig. 5 is a detail view on the bearing for supporting the brake operating shaft;

Fig. 6 is a section in the plane of line VI—VI of Fig. 4, showing a side view, on a larger scale, of the brake drum and brake;

Fig. 7 is a view similar to Fig. 6, showing a modified construction permitting of adjustment of the brake band;

Fig. 8 is a detail view of the connection between the shaft and the band in the embodiment shown in Fig. 7;

Fig. 9 is a side view of the parts shown in Fig. 8.

Referring to the drawings, 5 designates the usual frame construction, 6 is the rear axle, 7 the differential, and 8 the drive shaft of a Ford car. The transmission casing is designated 9. On the Ford car, as now made, a foot pedal 10 is mounted on the transmission casing. This pedal, as provided on a Ford car, moves laterally a very slight extent when the pedal is depressed, thereby drawing a brake band inside the transmission casing tight around a drum on the drive shaft inside the casing.

According to my present invention, I propose to use this pedal, but to disconnect it from the brake band inside the transmission and employ it for operating a brake on each of the rear wheels, designated 11.

To this end, I secure to the differential gear casing 7, by means of the usual bolts 12, a bracket or arm 13 carrying a bearing sleeve 14. At 15 are the usual radius rods extending from the forward bearing of the drive shaft to terminal portions of the rear axle. Clamped to each radius rod at points equi-distant from the rear axle, is a bearing 17. This bearing has welded thereto a U-bolt 18 of peculiar shape, by means of which the bearing is clamped to the radius rod. This construction is shown in Fig. 5.

Journaled in one of the bearings 17 and in bearing 14 is a shaft 19, and in the other bearing 17 and bearing 14 is a similar shaft $19^a$. Shaft 19—$19^a$ is, therefore, a divided shaft, having its abutting ends carried in the common bearing 14. Secured to shaft section 19 and to section $19^a$ are levers 20 and $20^a$, respectively. These levers connect through links 21 and $21^a$, respectively, to opposite ends of an equalizer bar 22 pivotally supported between its ends on a bar 23. This bar is pivotally connected at its forward end to a divided rod 24 that pivotally connects at 25 with the shank of the pedal 10. A turnbuckle 26 adjustably connects the divided sections of rod 24. A tension spring 27 is connected to the bar 23 and to the arm 13.

Upon depressing pedal 10, thereby rocking it forward, rod 24 and bar 23 with equalizer 22 are moved forward. The spring 27 serves to retract the parts. The pivotal connection at $23^a$, between bar 23 and rod 24, allows the parts to properly aline themselves. A bearing may be provided at 28 to slidably support and guide rod 24.

The reciprocable movement of the bar 23 and the equalizer imparts a rotary movement to shafts 19 and $19^a$ through links 21 and $21^a$ and levers 20 and $20^a$, respectively.

Secured to each wheel 11, over the usual emergency or hand brake drum $11^a$, is a centrally apertured disk 29 having an inwardly turned flange 30. The aperture of disk 29 centers the disk on drum $11^a$. U- bolts 31 serve to attach the disk to the spokes of the wheels.

Extending almost entirely around each flange 30 is a brake band 32 having a lining 33. On the free outer end of each shaft 19 and 19ª, as shown in Fig. 6, is a double lever or eccentric 34. The opposite ends of the brank bands connect at 35 and 36 to pins oppositely disposed on this eccentric. Consequently, when pedal 10 is moved forward, rocking shaft sections 19 and 19ª in the direction of the arrow in Fig. 6, the upper end of brake band 32 is drawn down and the lower end drawn up, thereby tightening the band on the flange or drum 30, from both ends. Due to the provision of jointed shafts 19 and 19ª and the equalizer, equal tension may be applied to each band.

The brake as thus constructed is extremely simple and efficient, and may be cheaply built and quickly installed on the present types of Ford cars, without alteration of the original parts.

Due to the fact that the provision of the eccentric on shafts 19 and 19ª does not provide for individual adjustment of the brake bands, and does not permit of such economical repair of parts, I prefer to use the modified form shown in Figs. 7, 8 and 9.

In this form of the invention, the free end of shafts 19 and 19ª have their extremities cut down to provide a flat surface 40. Rotatable on this portion of the shaft is a link 41 having a round hole therein, and the free end of this link pivotally connects at 42 with the lower end of the brake band 32. Passed over this substantially half rounded end of the shaft, is a second link 43 having an opening or slot 44 therein, the bottom of which is flat. The upper end of the link is extended to provide a threaded projection 45. At 46 is an inverted bow or U-shaped piece of metal, through the ends of which the shaft is rotatably passed. Projection 45 slidably passes through an opening in this housing, as it may be termed.

The upper end of the brake band is rolled over and fastened down to provide a loop in which a transverse pin 47 is rotatably received. The upper end of the extension passes through a slot in the loop and transversely through pin 47. A nut 48 on the extension serves to connect the parts. Surrounding the extension between the top of housing 46 and the pin 47 is a compression spring 49 that serves to urge the upper end of the band, and consequently link 43, upwardly, holding the flat end of the slot 44 against the flat part 40 of the shaft, thus eliminating any rattle.

When the shaft sections 19 and 19ª are rotated, link 41 remains stationary. The flattened end of the shaft, cooperating with the flat part of, slot 44, acts as a cam to draw link 43 downwardly and tighten the brake band. Adjustment may be made by taking up or loosening the nut 48.

Due to the ease with which this construction may be assembled or taken apart, renewal of parts may be readily effected.

I claim as my invention:

1. In a brake mechanism, a brake drum, a brake band embracing the drum, an operating shaft having a half-round cam thereon, a link having a slot therein fitted over said half-round cam, said link being connected with one end of the brake band, whereby a rotative movement of the shaft may effect the movement of the brake band, and a support for the other end of the brake band.

2. In a brake mechanism, a brake drum, a brake band embracing the drum, an operating shaft having a half-round cam thereon, a link pivotally and adjustably connected with one end of the brake band and having a slot therein operatively engaging said cam, whereby a rotative movement of the shaft effects a movement of the brake band, and a relatively fixed link pivotally connected with the other end of the brake band.

3. In a brake mechanism, a brake drum, a rotatable operating shaft, a cam on the operating shaft, a brake band embracing the drum having a transverse pin rotatably mounted at one end thereof, a slotted link having one end thereof adjustably passed transversely through the pin, said cam on the operating shaft operatively engaging the slotted portion of the link, and a relatively fixed supporting connection for the other end of the brake band.

In testimony whereof I affix my signature.

JOHN F. RICHARDSON.